United States Patent [19]
Palmer et al.

[11] 3,870,567
[45] Mar. 11, 1975

[54] BATTERY SEPARATOR MANUFACTURING PROCESS

[75] Inventors: Nigel Innes Palmer, Lexington; Nathan Sugarman, Needham, both of Mass.

[73] Assignee: W. R. Grace & Co., Cambridge, Mass.

[22] Filed: Dec. 21, 1972

[21] Appl. No.: 317,487

[52] U.S. Cl. ................ 136/148, 156/306, 161/150, 264/211
[51] Int. Cl. ............................................ H01m 3/00
[58] Field of Search ........... 136/143, 145, 146, 148; 161/150; 264/211; 156/306

[56] References Cited
UNITED STATES PATENTS

| | | | |
|---|---|---|---|
| 2,482,062 | 9/1949 | Hanson | 136/146 |
| 2,591,755 | 4/1952 | Wilson et al. | 136/146 |
| 2,700,694 | 9/1951 | Fernald | 136/146 |
| 2,707,201 | 4/1955 | Fernald et al. | 136/146 |
| 3,154,436 | 10/1964 | Tomaino | 136/146 |
| 3,632,715 | 1/1972 | Gowdy et al. | 264/211 |
| 3,704,198 | 11/1972 | Prentice | 161/150 |

FOREIGN PATENTS OR APPLICATIONS
914,363  11/1972  Canada ............................... 136/146

*Primary Examiner*—Donald L. Walton
*Attorney, Agent, or Firm*—Edward J. Hanson, Jr.; C. Edward Parker

[57] ABSTRACT

Battery separators and the like are produced from non woven mats of thermoplastic fibers which fibers contain an internal wetting agent that is relatively insoluble in battery electrolite and tends to bloom under conditions of use. After preliminary formation the nonwoven mat is heated and then compressed to increase the effectiveness of the wetting agent. The fibers may be formed from polypropylene resin that is treated at unusually high temperatures prior to extrusion and the extrudate attenuated, collected on a drum and compressed to form a preferred separator with small pores and high porosity.

8 Claims, 5 Drawing Figures

PATENTED MAR 11 1975

BATTERY SEPARATOR MANUFACTURING PROCESS

BACKGROUND OF THE INVENTION

This invention relates to nonwoven mats suitable for use as battery separators and, more particularly, to such mats with surfactants included in their fibers.

It has in the past been recognized that the provision of permanent wetting characteristics was important to good battery separator performance as indicated by U.S. Pat. No. 3,154,436. Special emphasis has been given to the problem because of the practice of providing dry charge batteries. In producing dry charge batteries a particularly severe problem is caused by the formation of the battery, i.e., the initial charging of the battery. After charging, the battery assembly must be washed to remove the acid. This washing, of course, tends to remove any wetting agent present in the separator. After washing it is the usual practice to heat dry the battery assembly and thus any wetting agent that is to be retained must have resistance to decomposition or volatilization under such circumstances. The long term bathing and agitation of the separators in a battery during use, in for example, an automobile also presents extreme conditions testing wetting agent retention. A battery separator is also subjected to surface abraiding against the battery plates and scouring by bubbles.

Other patents indicating battery environment difficulties with wetting agents include U.S. Pat. Nos. 2,773,114; 2,707,201; 2,662,032 and 2,662,107. U.S. Pat. No. 2,482,062 shows wetting agents used in fibrous battery separators.

SUMMARY OF THE INVENTION

By an aspect of this invention in a preferred form thereof a battery separator is produced from a wettable fiber formed from a plastic resin having a degree of undesirable hydrophobia, that is solid below 180°F, extrudable as a hot melt and resistant to degradation by at least either acids or alkalies. The fiber is comprised of the resin and a wetting agent. The resin and the wetting agent are preferably soluble in admixture with one another at the extrusion temperature for the resin and insoluble at room temperature. It is very important the wetting agent be developed. In one of its most preferred forms the wetting agent is comprised of two surfactants, one of which is relatively soluble in battery electrolite and the other of which is relatively insoluble in battery electrolite. The preferred fiber has a diameter of 0.05–50 microns and is contained in a mat of such fibers. The mat preferably is compacted and has a thickness of 5–50 mils, a porosity of more than 40 percent, 9 pore size of less than 40 microns, and enhanced resistance to delamination in the sulfuric acid environment of a lead-acid storage battery and produces only negligible foaming. The mat when removed from a battery and washed after initial battery charging and dried at about 200°F for 30 minutes the mat should preferably rewet sufficiently completely to provide an ER of no more than 25 milliohms after treatment in a sulfuric acid solution having a specific gravity of 1.20 at 160°F for 1 hour and being thereafter removed and washed in cold running water for one-half hour and then in stagnent water at 160°F for 1 hour and thereafter dried at 200°F for one-half hour. The mat should provide a battery with cold start performance such that in a Group 24 53 AH battery a cell will provide at least 1.00 volt at 280 amps at 0°F after 30 sec. and no readily observable delamination of the mat should be present after 6 months and in actual practice for more than 3 years.

By another aspect of this invention in one preferred form thereof a method is provided for producing battery separators using wettable fibers produced from polymeric resin having a degree of undesirable hydrophobia. The method includes mixing the polymeric resin and a wetting agent and extruding the mixture as a hot plastic through a die opening and forming a fiber. The mixing preferably includes melt blending the resin and wetting agent to form a solution of wetting agent in said polymer. Fiber formation preferably includes attenuating the extrudate beyond the die opening in a hot gas stream to a very small diameter fiber. Afterwards, the fiber is cooled and the wetting agent thereby made incompatible with the resin and its blooming encouraged.

In the preferred method it is very important to develop the wetting agent after the fiber has been cooled. Cooling need not be all the way to ambient temperature. Developing usually includes both heating and compression. The die opening is preferably one of a series arranged in a row and the attenuation is carried out essentially in a plane away from the die openings, and the attenuated fiber is collected on a continuously moving take-up device in a web with other fibers. The fibers are preferably collected in a web thickness of between 1 and 200 mils and formed into a thickness of 20–200 mils. Thereafter the web is compressed and the compression is not stopped until the web's permanent thickness is reduced to between 5 and 50 mils, its permanent porosity retention is greater than 40 percent and its permanent maximum pore size is less than 40 microns.

It is an object of the present invention to provide an improved method for producing battery separators.

It is a further object of this invention to provide a process that may be consistently and expeditiously performed to produce battery separators of superior performance.

It is a further object of this invention to provide such battery separators having long-life and enhancing a battery's cold start performance and long-life.

A still further object of this invention is to provide a nonwoven battery separator having the characteristics of good resistance to delamination and good resistance to gas accumulation.

DESCRIPTION OF THE PREFERRED EMBODIMENTS

Figure 1:
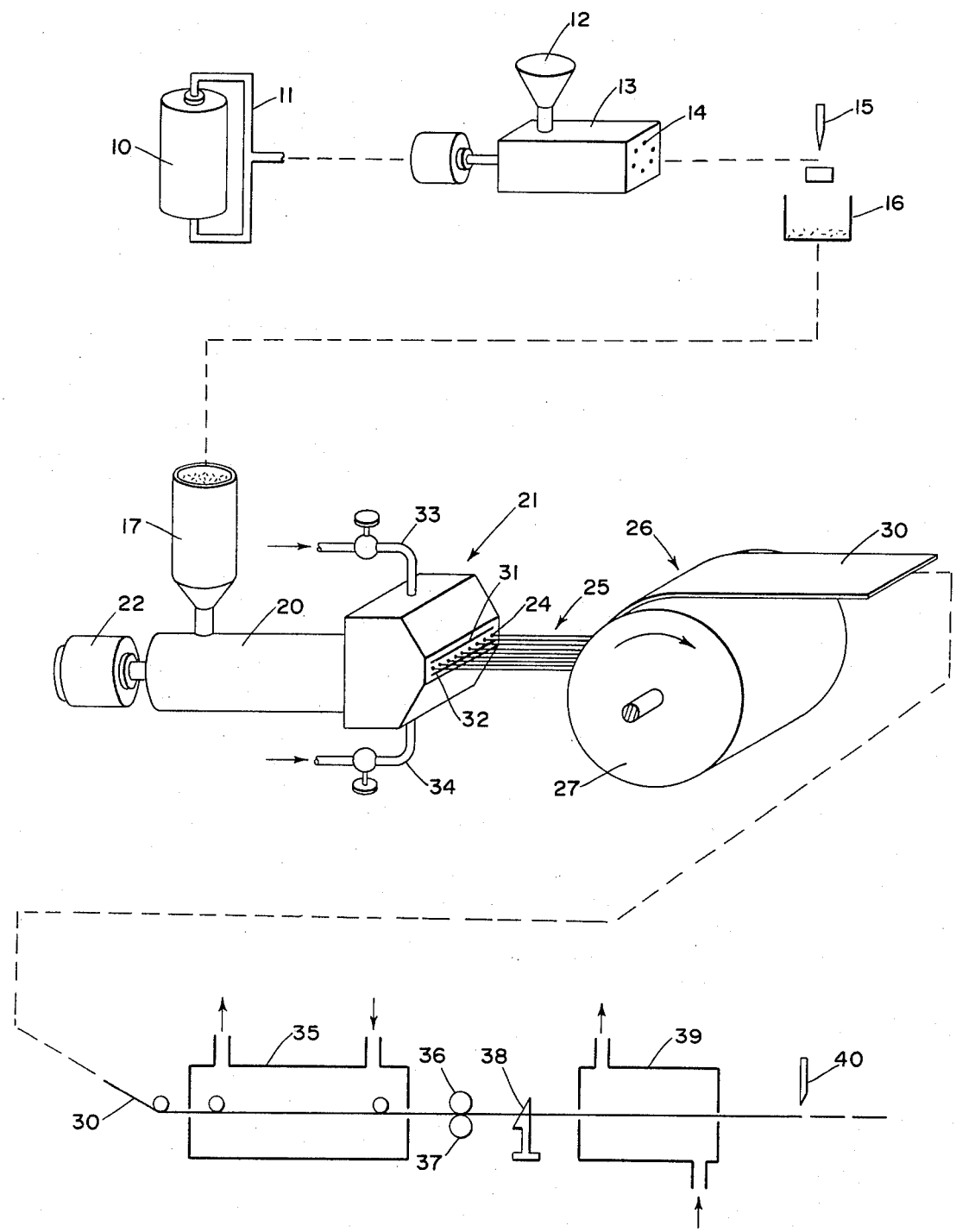
FIG. 1 is a schematic view of the overall process.

Briefly, the process of this invention in one preferred form is carried out as illustrated in FIG. 1 of the drawings. The resin and wetting agent that are to be formed into fibers are charged to the drum 10 which is then mounted in a tumbler arm as shown in FIG. 1. After a thorough mixing of the resin adn wetting agent the mixture is fed into the hopper 12 of extruder 13. The mixture ismelt blended in the extruder and extruded through the die 14 from which it emerges as strands. The strands are chopped by the chopper 15 into short lengths which are collected in bin 16. In this manner the initial mixture or coated blend is melt blended and pelletized. The blend is then removed from bin 16 and fed into the hopper 17 of the extruder 20. Alternatively, in some instances the wettng agent may be injected directly into the barrel of extruder 20. The preferred process includes thermal treatment of the resin in extruder 20 as will be further described later on.

The resin is forced through extruder 20 and out through die head 21 by the drive motor 22. The die head 21 preferably has a row of die openings 24 through which the resin passes as molten strands into a fluid stream which attenuates the resin into fibers 25. The fibers 25 are collected on a moving collecting device 26 such as a drum 27 to form a continuous mat 30.

The fluid stream which attenuates the resin is supplied through jets or slots 31 and 32. The jets 31 and 32 are supplied with the fluid which is usually a hot gas, preferably air, by fluid lines 33 and 34 respectively. The gas is preferably ejected from the slots immediately above and below the row of die openings.

After the preliminary mat has been formed it is preferable to compact the mat to obtain the desired thickness, porosity, mechanical properties of strength and stability, abrasion resistance and wettability. This is particularly important in the prduction of battery separators. It is preferable to heat the mat at an elevated temperature prior to compression to increase the effectiveness of the compression procedure. Relatively high temperatures that are all the same maintained substantially below the melting point also provide good tortional stiffness. In a continuous process the most convenient way of heating the mat to the required temperature is in an oven such as is illustrated at 35.

In many instances it is desirable to emboss the mat and this is preferably done at the same time the compacting is done. The calender rolls 36 and 37 of FIG. 1 are the preferred compacting-embossing means. These are shown enlarged in FIG. 2. The embossing roll temperatures are preferably maintained at approximately the same temperature as the temperature of the counter-current oven. If no embossing is being done then the calender rolls 36 and 37 shown in FIG. 2 can be reshaped in obvious manner to compact without embossment.

One of the most the wetting features of the present invention is the developing of thewetting agent. This is accomplished by heat and pressure, preferably at the same time as compaction, as will be discussed further hereinafter.

A slitting operation is carried out immediately after the mat leaves the nip of the calender rolls. The mat is quite hot after calendering in the preferred procedure and this facilitates slitting. The may may be slit with knife 38 (FIG. 1) or a razor with little difficulty.

After the slitting operation the mat is cut across the ribs. The mat is cooled prior to cutting across the ribs because this usually results in ribs having better mechanical properties. Heat may be removed from the mat by natural convection air circulation or cooling air may be provided, as shown in FIG. 1, through cooler 39. In either case, the nonwoven mat temperature should be reduced to at least 140°F in the preferred process prior to reaching the cutter 40. The nonwoven mat is then cut to a desired dimension. The cutter 40 may be of the guillotine type. The cutter 40 cuts the pressed nonwoven mat into the desired final dimension.

Figure 2:
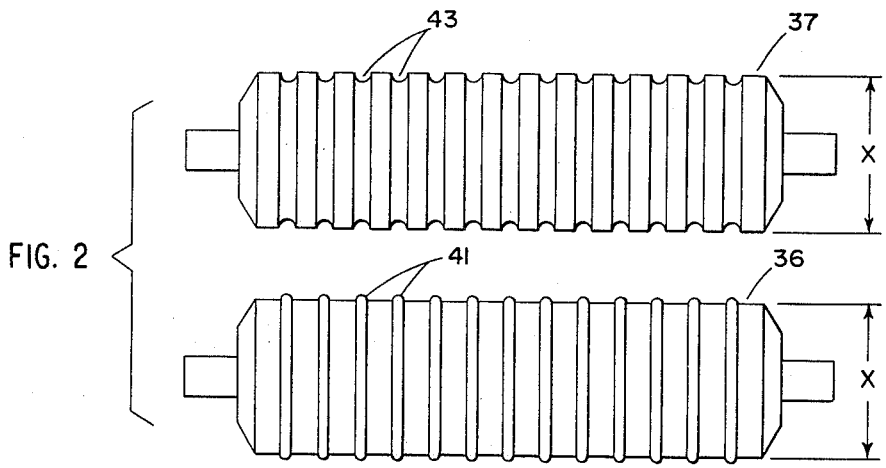
FIG. 2 is a schematic view of embossing rolls used to produce battery separators.

Turning now to a brief detailed description of the calendering means shown in FIG. 2, a male embossing roll 36 having ribs 41 may be seen. Exemplary of the spacing of the ribs is an 0.544 inch rib spacing for a total of 13 ribs 41. The diameter of the male embossing roll 36 is identical to the diameter of the female embossing roll 37. The female embossing roll has 13 grooves 43 therein. The spacing of the grooves is of course the same as the spacing of the ribs and it is preferred that the radius of the grooves be greater than the radius of the ribs, although the depth of the grooves nd the heighth of the ribs are preferably identical.

Figure 3:
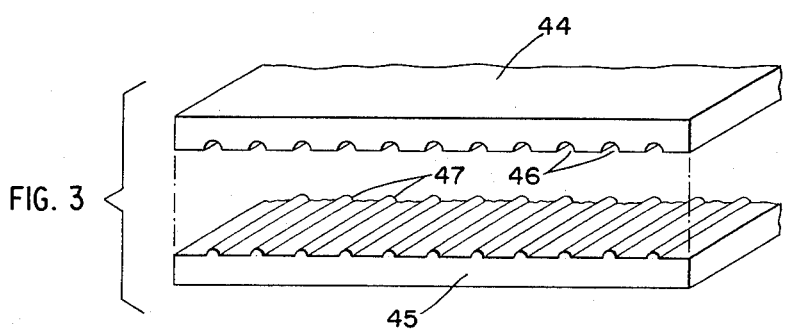
FIG. 3 is a schematic view of a battery separator press plate.
Figure 4:
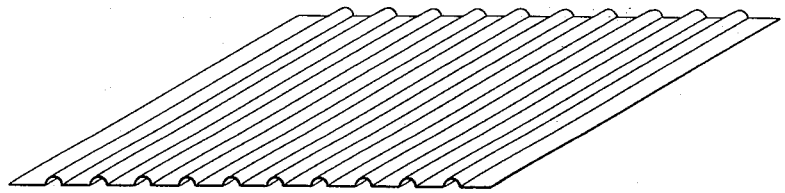
FIG. 4 is a schemtic view of a nonwoven battery separator with embossed ribs.
Figure 5:
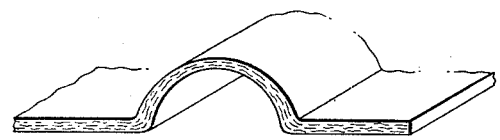
FIG. 5 is a detail of one of the embossed ribs of the nonwoven battery separator.

An alternate compressing and embossing means is shown in detail in FIG. 3. A specific plate pattern is shown for compressing and embossing discrete sections of the nonwoven mat 30. Upper press plate 44 and lower press plate 45 are moved into compressing relation with the nonwoven mat therebetween. Upper press plate 44 has 11 grooves 46 which may be spaced at 0.544 inch. The overall dimensions of one set of plates in a preferred embodiment could be 12 × ½ inches. Lower press plate 45 would have 11 ribs 47 spaced so as to be mutually compatible with the grooves in the upper press plate 44. The depth of the groove and heighth of the ribs may be the same. It is understood that these specific dimensions are set forth only to provide a specific embodiment found suitable for producing a preferred battery separator.

It is preferable to use teflon coated calender rolls or press plates. A spacer material may be utilized between the nonwoven mat and the pressing surface. Examples of such materials which may be used as spacers are Kraft paper, tissue paper, writing paper, fine cotton cloth, etc., which have a rough surface.

Special Features and Limitations

The preferred polymeric plastic resins for making battery separators are those that are solid below 180°F, extrudable as a hot melt and resistant to degradation by at least either acids or alkalies. Of coarse, to be applicable to this invention the resin must have a degree of undesirable hydrophobia. Such polymers are preferred for application of this invention as $C_2$ to $C_8$ polyolefin thermoplastic such as polyethylene, polypropylene and polystyrene and the preferred resins of this class are polymers of polypropylene and most preferably polypropylene. By polymers of propylene it is meant, polymers of propylene with other monomers such as styrene. For use in alkaline battery separators other resins such as nylon are preferred.

The preferred internal wetting agents are surfactants that are soluble in the resin at the temperature at which the resin will be extruded. It is important that the wetting agent have controlled retention in the specific extruded polymer even when it is formed into extremely fine fibers or filaments. Furthermore, in order to optimize the long-term wettability of the filament after it has been formed and otherwise processed and during use in environments that are particularly abusive of long-term agent retention, it is very desirable that the wetting agent have at least some tendency to surface bloom during use over a period of time. It is believed that the most desirable wetting agents are those that are imcompatible with the resin at the nonwoven mats use temperature, and preferably also at the after fiber extrusion and attenuation or formation processing temperatures, in order that a substantial amount of the wetting agent may be moved to the surface area of the fibers where it is needed. This lowers the amount of wetting agent required during initial fiber formation. Excessively large quantities of wetting agent required in the fiber during formation can weaken the fiber.

The most preferred wetting agents are nonionic surfactants that can be characterized on the basis of their ethylene oxide content or on the basis of hydrophilic/hydrophobic balance hereinafter referred to as HLB (Hydrophilic Lypophilic balance) number. When the wetting agent can be described in terms of both of the above characterizations, the most preferred wetting agent would fit the preferred ranges for both characterizations. The preferred ethylene oxide content is 1–15 moles of ethylene oxide added to a hydrophobic moiety. More preferably the ethylene oxide is 1–6 moles and most preferably 1–3 moles. The balance between the hydrophobic moiety and the ethylene oxide is between the desired wettability and the necessary water insolubility so that the wetting agent will not be readily washed from the surface of the fiber.

Particularly preferred surfactants are $C_8$ to $C_{18}$ phenol surfactants having 1–15 moles of ethylene oxide more preferably 1–6 moles of ethylene oxide and most preferably 1–3 moles of ethylene oxide. These surfactants are relatively water insoluble but oil soluble. Their ethylene oxide values are lower than some that have substantially higher water solubility and therefore a more uncontrolled retention.

The preferred HLB numbers for the wetting agent are those below 5. This generally provides a significant degree of hydrophilic character to the fiber surface with a sufficiently low wetting agent solubility so that the wetting agent will not be readily washed from the surface of the fiber. Relatively low water solubility is generally found in wetting agents with low HLB numbers.

The preferred surfactants are added in the preferred amounts of 0.5–20 percent by weight of the weight of the resin, more preferably 1–10 percent by weight of the resin and most preferably 1–3 percent by weight of the resin.

Other wetting agents suitable for internal use in some situations are, for example, (1) ethoxylated fatty alcohol ethers such as: (a) BRIJ 72 (Atlas Chemical Ind.), polyoxyethylene stearyl ether (2 moles EtO), (b) Trycol LAL-4 (Trylon Chemicals), ethoxylated fatty alcohol ether (4 moles EtO; (2) Ethoxylated fatty acids such as: (a)Teric 124 (ICI, Australia, Ltd.), (b) Ethofat 0/15 (Armak Co.); (3) Ethoxylated adduct of propylene oxide with propylene glycol: (a) Pluronic L-121; (4) Phosphate ether ethoxylates: (a) Emcol CS-113 (Witco Chem. Corp.). In non-battery applications internal wetting agents such as fatty esters of sorbitol, fatty esters of glycerol, alkanolamides and ethylene oxide condensation products of primary amines maybe preferred in some situations.

Fibers containing wetting agents having the lower HLB numbers and lower ethylene oxide molar contents may not have the degree of wettability that would provide optimum rapid penetration and wetout of fibrous mats made therefrom. Wetting agents with higher HLB numbers and lower ethylene oxide contents tend to be more water soluble and hence may dissolve from the surface of the fibers into the surrounding acid causing foaming during battery formation. Therefore, this invention provides a first wetting agent within the polymer which has low water solubility, low foaming capacity and provides a degree of enhanced wettability of the fibers, which when enhanced by the second wetting agent will provide a degree of wettability to the fibers which will produce mats which are readily penetrated and wetout by acid.

In a most preferred specie of this invention a second internal wetting agent is provided that is preferably classified as relatively water soluble and relatively oil insoluble and belongs to a class of wetting agents having relatively high HLB numbers as compared to that of the first wetting agent. The preferred HLB numbers for this second wetting agent are those above 5. In wetting agents having ethylene oxide as their primary hydrophilic functional group the preferred ethylene oxide molar content of the second wetting agent is above 8 moles ethylene oxide.

The second wetting agent provides a higher degree of wetting than that provided by the first internal wetting agent, causing the mat to be rapidly and completely penetrated and wetted by the acid with which it comes in contact. This second wetting agent is preferably selected from the group consisting of anionic surfactants and nonionic surfactants and mixtures thereof. However in some instances cationic wetting agents maybe selected equally as well and used either independently as the second wetting agent or with either or both of the other types of wetting agents. The second wetting agent is preferably added with the first wetting agent and in an amount of 0.5–3 percent, more preferably 1–2 percent by weight, based on the weight of the resin. The two wetting agents together preferably are added within the limits of 1–10 percent by weight more preferably 2–5 percent by weight.

As broadly used in the claims of this application, when not otherwise restricted the terms internal and the external wetting agents and first and second wetting agents are intended to include materials that are not in and of themselves wetting agents but function with another material to affect it in some manner such as by retention or to form a wetting agent or to provide an enhanced wetting effect. Furthermore a "wetting agent" may be made up of several chemical materials. In other words the wetting agent maybe several wetting agents mixed together.

In order to form the preferred nonwoven mat or web of this invention from the preferred resins, and particularly the preferred polypropylene resin, it is important to thermally treat the polymer before extruding it as a fiber in practicing the preferred method. With polypropylene the treatment preferably includes heating the resin in extruder 20 at temperatures in excess of 550°F and more preferably to temperatures between 600° and 900°F and most preferably within a range between 620° and 800°F. It is generaly preferable to maintain the die at a temperature slightly below that of the extruder barrel. The die temperature may be 20° - 100°F below the barrel temperature. The importance of the thermal treatment seems to be, at least in part, to degrade the polymer and increase the polymers flow properties. In many instances the flow properties are seemingly increased from an impracticable to a practicable condition. This appears to be true of the extrudable fiber forming resins in general when formed into fiber mats according to this invention.

The preferred attenuating fluid is gas in the usual situation and the preferred gas is air. The gas is preferably ejected from the slots immediately above and below the row of die openings at a temperature between 540°F and 1,000°F. For a detailed description of the die 21 reference may be had to U.S. Pat. No. 3,650,866 entitled "Increasing Strip Tensile Strength of Melt Blend Nonwoven Polypropylene Mats of High Tear Resistance," issued Mar. 21, 1972.

The gas flow is controlled so that the fibers as they are attenuated do not significantly come into contact with one another, which could result in "roping" and fiber bundles. The gas is heated as previously set forth and its flow is controlled to produce very fine fibers preferably having a diameter between 0.05 and 50 microns, preferably less than 10 microns, more preferably between 1 and 10 microns and most preferably of about 1 to 5 microns. Suitable Polypropylene mats have been attained at air rates between 0.7 and 4 lbs per minute with the Polypropylene fibers attenuated in the gas stream at these rates averaging between about 1 to 10 microns in diameter.

In the preferred process the strands of blended resin are attenuated into fibers essentially in a plane directly away from the die openings 24. The fibers tend to be discontinuous. This occurs because of their extreme fineness which results in frequent breaks. Of course the diameter of individual sections or small portions of the fibers may vary somewhat outside of the given ranges due to the fact that air attenuation does not give perfect control and also because of slight variations in the resin extrudate flow. As used herein, the work fiber refers to either continuous or discontinuous threadlike structure.

The fibers are collected as a self supporting mat on the collecting device 26. The collecting device 26 moves or rotates continuously and is preferably positioned from 1 to 30 inches from the die openings, more preferably 1 to 18 inches from the openings and most preferably 3 to 8 inches from the die openings. The fibers are "self bonded" in the mat in that the mat is coherent, integral and capable of withstanding normal handling such as winding and unwinding, cutting, pressing, calendering, etc. without losing its essential mat-like or web-like character. In most instances, and particularly when the preferred polymers are used, some thermal or melt bonding occurs. Bonding is usually maintained predominantly through the mechanism of entaglement in the original collected web or mat. The mat preferably has a basis weight of between 10 and 500 grams per square meter and more preferably between 20 and 300 grams per square meter. The mat thickness in its original collected state is preferably between 1 and 200 mils, more preferably 20 and 200 mils and most preferably between 20 and 100 mils.

The maximum temperature that the mat can sustain prior to or during compression differs for mats formed from the various resins including the various preferred resins. For example, within the $C_2$ to $C_8$ polyolefin group the temperatures differ for polypropylene as compared to polystyrene or mixtures thereof or as compared to polyethylene. But, in general the temperature is limited by excess shrinkage of the mat and additional polymer degradation or melting. It is important, however, that the temperature be high enough to improve the strength, wettability, permanence of integrity and other characteristics in a manner sufficient to provide properties essential to the intended use. Thus it has been found that the mat must generally be heated to above the resins softening point. For a mat of the preferred polypropylene fibers, mat temperatures to which the mat may desirably be heated prior to compaction are from about 280° to 320°F and more preferably between about 290° to 310°F and most preferably 295° to 305°F. Compacting should be accomplished at relatively high temperatures, but at substantially less than the melting point for good tortional stiffness. The nonwoven mat is preferably compacted to a thickness of between 5 and 50 mils, more preferably between 10 and 20 mils for preferred use in such applications as battery separators.

In determining the temperatures at which compaction should be carried out with each polymer it may be necessary to employ an empirical technique and this is within the preview of this invention. This technique contemplates selecting the highest temperature at which fusion does not occur, i.e. about 320°F., for polypropylene. Compaction is carried out at that temperature. If porosity is not adequate, then samples are made at progressively lower temperatures until the temperature is found that will fall within the porosity parameters discussed below.

Thus, of necessity, there may be a "zeroing in" approach of finding the fusion temperature and progressively lowering the temperature below the fusion temperature in 2°, 3° or 5° increments until the best temperature in the range is found. Generally, that temperature will be about 300°F for polypropylene. For other polymers and resins, greatly different temperatures will be needed.

Nevertheless, it is important and to be specifically noted that, in general, the proper temperature for achieving the critical parameters for a mat that is to be used as a battery separator, for example, will range quite considerably below the melting point of a particular polymer. As a rule of thumb, that point will be about 5° to 20°F, preferably 5° to 15°F, above the softening point of the polymer and 5 to 50, preferably 5° to 35°F, below the melting point.

The compacting operation, which also supplies the heat and pressure for development, is preferably carried out by utilizing calender rolls, however, a press may also be used to obtain a nonwoven mat of deisred properties. In either case, compaction using a fixed gap is preferred. The gap is preferably a fixed gap and such that the mat sees a pressure of no more than 10 psi and more preferably from 2-8 psi during compaction. The setting of the gap, the size and composition of the fibers, the closeness or initial compaction of the fibers, the thickness of the initial or starting mat and the thickness of the final or finished mat should be so matched up with the operating conditions that the compacted mat has a void fraction or porosity of at least 40 percent and preferably a void fraction or porosity of 50 to 65 percent. Thus the porosity retention is preferably greater than 40 percent and more preferably greater than 50 percent at the end of the compression phase. The pore size is preferably less than 40 microns and more preferably less than 20 microns. With the preferred mats of this invention the fixed gap between the compacting means is 4 – 5 microns for non fused region.

Most important is the effect of heat and pressure on development of the surfactant during compaction. By wetting agent or surfactant development it is meant that the wetting agent's effectiveness is increased. This is believed to be, at least in part, due to a forcing of more wetting agent to the fiber surface and perhaps also, to some sort of spreading effect on the fiber surface or other increase in the surface area of exposure of the wetting agent. Surprisingly the development also seems to very significantly enhance resistance to delamination under the abuses of use and vibration in a lead acid storage battery. The development operation not only increases wettability and rewettability but also increases the bonding of the fibers together by means of heat and pressure and provides desired mechanical and electrical properties.

The specific finished dimensions of the nonwoven web will vary depending on the intended end use. Even in the case of the preferred use as a battery separator the dimensions will vary with the battery cell design and accordingly the slitting and cutting are carried out to dimension the nonwoven web to fit a specific cell design. It has been found, according to the present invention, that the slitting operation is best carried out immediately after the mat leaves the nip of the calender rolls, when the mat is compacted and embossed by calendering. If press plates are used, it is also desirable to slit the mat immediately after pressing since the mat is quite hot after this operation, which facilitates slitting the mat with precision as to any rib pattern being produced.

Small pore size is very important in battery separators. Small pores are an effective barrier to battery plate material going through a separator and bridging between opposite plates of the battery and causing shorting. In order to achieve low electrical resistance in a battery a high percent porosity is necessary in the nonwoven mat of the present invention.

For any nonwoven mat of given fiber size, an increased percent porosity also increases the maximum pore size because the distance between adjacent fibers must be increased. Thus decreased pore size may be achieved with a high percent porosity by decreasing the fiber size in the nonwoven mat. By forming the same weight of resin into very small fibers and randomly distributing these fibers, the fiber-to-fiber distance is reduced and thus smaller maximum pores may be obtained. The very small fiber sizes (1-10 microns) utilized in the present invention make possible the combination of low electrical resistance and low maximum pore size in the nonwoven mat.

In certain applications it is desirable that the nonwoven mats also provide a mechanical spacing function different from that provided by its own thickness. This spacing may be provided by means of ribs formed in or attached to the mat. Preferably, the mat is formed into a corrugated configuration with the outer curved corrugations being substantially fused and nonporous at their outermost regions. If the ribs are to be formed in the nonwoven mats the embossing operation is preferable provided concurrently with the compressing operation as already mentioned.

Several special procedures may in certain instances be advantageously added to the process of this invention as set forth above. One such additive procedure is the after-sizing of the embossments. Following the rib formation and compacting operation, the embossed mat may be passed through a second set of fixed gap calender rolls. These calender rolls would have a smooth surface and may be operated at from room temperature up to about 290°F in the case of polypropylene mats. The purpose of this second set of calender rolls is to partially flatten the ribs formed in the previous steps so that the battery separator has a more exactly uniform overall configuration.

Product

The fine fibers of the invention are formed of plastic and preferably the preferred plastic resins, already enumerated. The fibers contain an evenly distributed internal wetting agent that has controlled retention. The wetting agent is preferably developed to enhance wettability and has a tendency to bloom enhancing long lived wettability. The wetting agent is preferably present in an amount 0.1 – 8 percent by weight based on the weight of the resin after processing including the compression procedure. The more preferred wetting agent content is 0.1 – 2 percent by weight based on the weight of the resin. The preferred wetting agents are those already enumerated. They are preferably soluble in admixture with one another at the extrusion temperature for the resin and insoluble at room temperature.

The fine fibers preferably have a diameter of 0.05 – 50 microns, and most preferably less than 10 microns, more preferably 1-10 microns preferably about 1-5 microns. The mats preferably have a basis weight of 10-500 grams per square meter and more preferably 20-300 grams per square meter. The mat is preferably 5-50 mils thick, more preferably 10-20 mils thick and has a porosity of at least 40 percent more preferably 50-65 percent and most preferably greater than 50 percent. At the same time pore size is preferably less than 40 microns, more preferably less than 20 microns and in better quality sheets, runs about 7-20 microns.

When the mat is used as a battery separator, it preferably produces no readily observable foam during initial forming and charging and in most cases it is essential that foaming be only negligible at worse. When the separators are subjected to the Standard ER (Electrical Resistance) test of the Battery Council International, 1801 Murchison Dr., Burlingame, Calif. the initial ER after 24 hours is at least no greater than 25 milliohms and more preferably no more than 20 milliohms.

When the battery separator mat is put in a sulfuric acid solution having a specific gravity of 1.280 and heated to 160°F and held for 1 hour at that temperature and thereafter removed from the acid solution and washed in cold running water for one-half hour and then in stagnant hot water at 160°F for 1 hour and dried at 200°F for 30 minutes, it should have an ER of no more than 25 milliohms and preferably no more than 20 milliohms when assembled and tested as set forth in the preceding paragraph. This illustrates that the wetting agent is permanent because the ER is substantially unchanged by the severe washing conditions.

When assembled in a Group 24, AH battery and tested in accordance with SAE J537g for Cold Start the performance is at least 1.00 volt per cell at 280 amps after 30 seconds and the electrical resistance is no more than 25 milliohms after the test. High amperage take out during cold start procedures has been observed to cause delamination in mats that do not have the preferred characteristics and in particular the inside the fiber wetting agent. This delamination appears to be at least in part, due to the accumulation of gas in the separator under the conditions of the cold start test. There should be no readily observable delamination after the cold start test. This means substantially no delamination areas, irregularities or observable changes in the surface of the mat exceeding the size of a dull pencil point, about 30–50 mils. In poor quality mats that did not contain the wetting agent delaminations as large as half-dollars were observed. If it is attempted to add large quantities of surfactants as coatings, a problem is often presented by the transfer of substantial quantities of surfactant into the battery electrolyte which then distributes the surfactant to the battery plates and elsewhere causing damage.

The wettability or non wettability of a nonwoven mat is not only a function of the hydrophobic nature of its fibers but also a result of the size of its pores. Mats with pores having diameters several times larger than 40 microns wet much more readily than those having pores of 40 microns or less. Thus the compressed battery separator mat requires a more effective wetting system than would the uncompressed original mat.

Test and Statistical Procedures

Various tests are used to ascertain the characteristics of the battery separator. Some of these have already been discussed. Another determination is basis weight, which, is determined by dividing the weight in gm by the area in square meters. The maximum pore size is a measurement of the largest pores or openings in the structure. Pore size determinations are carried out using an Aminco-Winslow Mercury Porosimeter.

EXAMPLE I 50 pounds of polypropylene resin (Enjay TM Standard Oil Co. E-117) which is a standard commercial resin containing additives such as oxidative stabilizers and 2 ½ pounds (5 percent by weight based on the weight of the resin) of nonylephenol ethylene oxide containing 4 moles of ethylene oxide (Tergitol TM - Union Carbide NP-14) are charged to drum 10, FIG. 1. The resin is charged into the drum first and the surfactant is poured evenly over the top of the resin. The drum is then tumbled for about 30 minutes until the materials are well mixed. The mixture is then charged to hopper 12 of the melt blending strand cutter. The material is extruded as strands into a water bath after which the strands are cut. The pellets so formed are about one-eighth inch long and one-eighth inch in diameter.

The pellets are fed to hopper 17 and through extruder 20 where they are treated at about 650° ± 20°F. The attenuating air is about 680°F ± 20°F at lips of jets 31 and 32. The polymer feed rate is 0.5 ± 0.2 grams/hole/min. The air rate is 30-40 pounds/pound of polymer feed/min. The collector 27 is 9 inches from the die 21. The fibers are collected in a web having a basis weight 175 grams/square meter. The mat is cut by using a hand cutter to an appropriate battery separator size of 8 × 12 inches. The pieces are placed in the compactor of FIG. 3 and compacted to approximately 16 mils thickness by pressing to a gap of 18 mils. The press of FIG. 3 is operated with a plate temperature of about 280°F – 300°F and the press remains closed for about 20 seconds.

EXAMPLES 2-9

The procedure of Example 1 is repeated except the surfactant is varied as indicated:

Example 2, 2 ½ pounds (5 percent) of Dodecylphenol containing 5 moles of Ethylene Oxide (Tergitol 12-P-5, product of Union Carbide);

Example 3, 1 ¾ pounds (3 ½ percent) of Nonylphenol containing 13 moles of Ethylene Oxide (Tergitol NP-33, product of Union Carbide);

Example 4, 1 ¾ pounds (3 ½ percent) of Nonylphenol containing 9 moles of Ethylene Oxide (Tergitol TP-9, product of Union Carbide);

Example 5, 1 ¾ pounds (3 ½ percent of modified polyethlated alcohol (DF-12, product of Rohm & Haas);

Example 6, 2 ½ pounds (5 percent) of Dodecylphenol containing 6 moles of Ethylene Oxide (Tergitol 12-P-6, product of Union Carbide);

Example 7, 2 ½ pounds (5 percent) of Nonylphenol containing 4 moles of Ethylene Oxide (Tergitol NP-14, product of Union Carbide);

Example 8, the procedure of Example 2 is repeated except 1 percent alkylarylpolether (Triton X-100, product of Rohm & Haas) is added with the wetting agent of Example 2.

Example 9, the procedure of Example 3 is repeated except 1 percent of Nonylphenol having 40 moles of ethylene oxide (Tergitol NP-44, product of Union Carbide) is added with the wetting agent of Example 3.

Examples 8 and 9 contain 2 relatively water and battery electrolite insoluble wetting agents (the wetting agents of Example 2 and 3) and 2 relatively water and battery electrolite soluble wetting agents (the wetting agents newly added).

Samples from Examples 1–7 prepared by the above procedures were subjected to the cold start test previously identified.

COLD DISCHARGE TEST RESULTS

| | 280A at 0°F. | | | ER | |
|---|---|---|---|---|---|
| Example | 5 Sec. Volt. | 30 Sec. Volt. | Minutes to 1.0v | Initial | After Test |
| 2 | 1.24 | 1.20 | 1.60 | 23 | 22 |
| 3 | 1.28 | 1.23 | 1.70 | 16 | 13 |
| 4 | 1.30 | 1.25 | 1.79 | 14 | 13 |
| 5 | 1.27 | 1.22 | 1.60 | 15 | 14 |
| | 10 Sec.* | | | | |
| 6 | 1.24 | 1.20 | 1.64 | | |
| 7 | 1.29 | 1.26 | 1.18 at * | 32 | 30 |
| | 210A – 20°F | | | | |
| 6 | 1.31 | 1.29 | 1.20 | | No test but after 20 hr. |
| 7 | 1.24 | 1.20 | .82 | 32 | 27    32 |

* below this symbol on new basis indicated

With the exception of Example 7 all of the separators produced too much foam during charging for use in commercial operations without change either through foam reduction or charge procedures. The Cold Discharge test was conducted according to SAE J537g using a Group 24, AH battery and ER was according to the test of the Battery Council International.

The mats of Examples 1 and 2 analyzed after formation and without being subjected to any other wetting agent removal conditions are found to contain about 65 percent (within a 1 percent deviation) of the surfactant added initially. The wetting agent retention is preferably held to within 65 ±5 percent by the end of processing and also by the end of formation. Of course, most preferably the loss is the least possible.

The invention of the application not only enables the production of a nonwoven fine fibered web that has abuse resistant wetting properties to an unexpected degree but also and totally unexpectedly much improved delamination resistance. The nonwoven web also provides good gas release or low gas accumulation properties in lead acid storage battery environments. Furthermore the nonwoven webs both before and after compression appear more uniform.

The primary internal wetting agents do present some problem with foaming and entrance into the battery electrolite when used in sufficient quantities to provide the most desirable degree of wettability in its own right. Its low solubility in the batter electrolite provides a strong property of longer and better retention in the fiber but because of its generally lower wetting effectiveness it is usually necessary to use fairly large quantities if it is to be the sole wetting agent. This can be seen to be particularly true when only part of the wetting agent is usually disposed at a for action functioning at any time.

As a general proposition the second internal wetting agent which is relatively quickly soluble in the battery electrolyte seems to have substantial advantage in providing quick wet out. But when used at a sufficiently high level to bring about good wetting retention and rewetting characteristics in its own right it causes substantial foaming during battery charging. In addition when substantial quantities of wetting agent are used there is very substantial tendency for these to enter the battery electrolyte and be transferred to the battery plates and elsewhere impairing the battery's operation.

Suprisingly, when the primary and secondary wetting agents are used together, a sufficient amount can be used in combination to maximize good initial wetout, good rewet and good continuous wettability without substantial disadvantage. The development of the wetting agents also seems to bring about a synergistic type of effect with respect to the retention of the secondary wetting agent at the surface of the fiber. While the reason for this result is not known, it is believed that it may be at least partially due to the increased adhesion of the second wetting agent to the fiber surfaces.

It will be obvious to those skilled in the art that various changes and modifications may be made in the invention without departing from its true spirit and scope. It is, therefore, aimed in the appended claims to cover all such equivalent variations as fall within the true spirit and scope of the invention.

We claim:

1. A method for producing a battery separator using nonwoven fibers formed from a polymeric resin having a degree of undesirable hydrophobia, solid below 180°F, extrudable as a hot melt and resistant to degradation by at least either acids or alkalies comprising forming a mixture of said polymeric resin and wetting agent, the wetting agent being included in an amount of 0.5 – 20 percent by weight based on the weight of the resin with said amount being (a) incompatable with the resin below the resin's melting point such that the wetting agent will bloom over a period of time at ambient temperatures in a battery yet (b) compatable with the resin at the extrusion temperature; extruding said mixture as a hot plastic through a die opening and forming a fiber containing said wetting agent therein; forming said fiber into a web comprising other like fibers; developing said wetting agent by heating said fiber and forming said battery separator.

2. The method of claim 1 wherein the wetting agent development includes applying pressure to said web.

3. The method of claim 2 wherein said wetting agent is comprised of two surfactants, one of which is relatively soluble in battery electrolyte and the other of which is relatively insoluble in battery electrolyte.

4. The method of claim 3 wherein the surfactant that is relatively soluble in battery electrolyte is relatively water soluble and relatively oil insoluble and the surfactant that is relatively insoluble in battery electrolyte is relatively water insoluble and relatively oil soluble.

5. The method of claim 1 wherein said mixture is formed by melt blending, forming a solution of said wetting agent and said resin and said mixture is subjected to a thermal treatment at a temperature in excess of 550°F and sufficiently high to at least partially degrade the resin prior to extrusion and said fiber formation includes attenuation immediately beyond said die opening in a hot gas stream with a wetting agent retention of 65 ± 5 percent.

6. The method of claim 1 wherein said wetting agent is mixed with said resin in an amount of 1 – 10 percent by weight based on the weight of the resin, said fiber is formed with said other fibers from said mixture through a common die through independent die openings, said fibers being formed with diameters between 0.05 and 50 microns, said web being formed by collecting said fibers on a continuously moving take-up device from 1–30 inches from said die openings in an amount having a basis weight between 10 and 500 grams per square meter and said web is compressed to a permanent thickness of between 5 and 50 mils, to a web porosity retention greater than 40 percent and a maximum pore size less than 40 microns.

7. The method of claim 6 wherein said resin and said wetting agent are in solution at the time of extrusion and are brought to a heterogeneous state after extrusion but before development, and said development includes compression of said web and said heating includes the heating of said web to a temperature between the softening point and the melting point of the resin and said development proceeds until said web acquires resistance to delamination in the sulfuric acid environment of a lead-acid storage battery and resistance to tearing.

8. The method of claim 1 wherein said resin is a polymer of polypropylene, said mixture is subjected to a thermal treatment at a temperature between 620°–800°F, said mixture is forced through a plurality of die openings by a screw extruder to form said fiber and said other like fibers, the die is operated at a temperature between 575°–750°F, the fiber formation includes air attenuation with said air ejected from slots adjacent said die openings at temperatures between 540° and 1,000°F, the fibers are collected on a continuously moving take-up device positioned 3 to 8 inches from said die openings to form said web, said attenuation is to the extent that the fibers have diameters averaging between about 1 to 10 microns, the fibers are collected in a web thickness between 20 and 200 mils and a basis weight between 20 and 300 grams per square meter, said web is thereafter heated to between 290° and 310°F and compressed to a thickness between 10–20 mils with a pressure less than 10 psi to a gap of 4–5 microns with a final porosity retention greater than 50 percent and a maximum pore size less than 20 microns, said compression including the deforming of said nonwoven web into a corrugated configuration, the outer curved corrugations having their outer regions substantially fused and rendered substantially nonporous and said heating and said compression being at least part of the developing process.

* * * * *